United States Patent
Sailer et al.

(10) Patent No.: US 10,715,385 B2
(45) Date of Patent: Jul. 14, 2020

(54) SYSTEM AND METHOD FOR LIVE MIGRATION FOR SOFTWARE AGENTS

(71) Applicant: International Business Machines Corporation, Armonk, NY (US)

(72) Inventors: Anca Sailer, Scarsdale, NY (US); Mahesh Viswanathan, Yorktown Heights, NY (US); Jing Min Xu, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/143,908

(22) Filed: Sep. 27, 2018

(65) Prior Publication Data

US 2020/0106667 A1 Apr. 2, 2020

(51) Int. Cl.
*G06F 15/16* (2006.01)
*H04L 12/24* (2006.01)
*H04L 29/08* (2006.01)
*G06F 9/48* (2006.01)

(52) U.S. Cl.
CPC ........ *H04L 41/0813* (2013.01); *G06F 9/4856* (2013.01); *H04L 41/5041* (2013.01); *H04L 41/5058* (2013.01); *H04L 67/34* (2013.01)

(58) Field of Classification Search
CPC ............. H04L 41/0813; H04L 41/5041; H04L 41/5058; H04L 67/34; G06F 9/4856
See application file for complete search history.

(56) References Cited

U.S. PATENT DOCUMENTS

| | | | | |
|---|---|---|---|---|
| 7,447,728 B1* | 11/2008 | Arunkumar | ............. | H04L 41/00 709/200 |
| 7,627,871 B2* | 12/2009 | Buskens | ................. | G06F 9/544 719/313 |
| 7,752,603 B2* | 7/2010 | Harutunian | ............... | G06F 9/54 717/108 |
| 7,873,941 B2* | 1/2011 | Buskens | ............... | G06F 9/4856 709/202 |
| 9,355,228 B2* | 5/2016 | Smith, III | ............. | G06F 21/121 |
| 9,449,298 B2* | 9/2016 | Lowry | .................... | G06Q 10/10 |
| 9,864,391 B2* | 1/2018 | Lu | ............ | G05B 15/02 |
| 9,935,845 B2 | 4/2018 | Firment et al. | | |
| 10,142,180 B2* | 11/2018 | Liu | ...................... | H04L 41/0843 |

(Continued)

FOREIGN PATENT DOCUMENTS

WO 2012139098 A1 10/2012

OTHER PUBLICATIONS

"Dynamic routing," Wikipedia, https://en.wikipedia.org/wiki/Dynamic_routing, 3 pages.

(Continued)

*Primary Examiner* — Moustafa M Meky
(74) *Attorney, Agent, or Firm* — Robert C. Bunker

(57) ABSTRACT

A computer-implemented method, computer program product, and computing system is provided for switching between software agents. A first software agent communicatively coupled to a host device and at least one server may be identified. A configuration file associated with the first software agent may be transformed for operation with a second software agent. The first software agent may be switched to the second software agent in response to transforming the configuration file associated with the first software agent.

20 Claims, 10 Drawing Sheets

(56) References Cited

U.S. PATENT DOCUMENTS

| | | | |
|---|---|---|---|
| 2005/0204282 A1* | 9/2005 | Harutunian | G06F 9/54 |
| | | | 715/200 |
| 2005/0289093 A1* | 12/2005 | Buskens | G06F 9/544 |
| 2013/0091285 A1 | 4/2013 | Devarakonda et al. | |
| 2014/0020049 A1* | 1/2014 | Smith, III | G06F 21/121 |
| | | | 726/1 |
| 2014/0229622 A1 | 8/2014 | Supalov | |
| 2016/0149761 A1* | 5/2016 | Liu | H04L 41/0843 |
| | | | 709/221 |
| 2016/0255058 A1* | 9/2016 | Smith | G06F 21/121 |
| | | | 713/150 |
| 2018/0019928 A1 | 1/2018 | Firment et al. | |

OTHER PUBLICATIONS

Fowler, "Blue-Green Deployment," Mar. 1, 2010, https://martinfowler.com/bliki/BlueGreenDeployment.html, 3 pages.

Ribbon, https://github.com/Netflix/ribbon, Netflix, 2014, 4 pages.

Baldini et al., "Cloud-Native, Event-Based Programming for Mobile Applications," 2016 IEEE/ACM International Conference on Mobile software Engineering and Systems, May 16-17, 2016, pp. 287-288.

Balalaie et al., "Microservices Architecture Enables DevOps: An Experience Report on Migration to a Cloud-Native Architecture," https://spiral.imperial.ac.uk/ . . . /SO_SWSI-2015-10-0149.R1_Balalaie.pdf, pp. 1-13.

Toffetti et al., "Self-managing cloud-native applications: design, implementaion, and experience," Preprint submitted to Future Generation Computer Systems, Sep. 12, 2016, Zurich University of Applied Sciences, School of Engineering, pp. 1-37/.

\* cited by examiner

SYSTEM AND METHOD FOR LIVE MIGRATION FOR SOFTWARE AGENTS

BACKGROUND

In modern cloud-based microservices and applications, service instances may have dynamically-assigned network locations. Moreover, the set of service instances may change dynamically because of auto-scaling, failures, upgrades, etc. As such, client code may need to use a more elaborate service discovery mechanism.

Additionally, conventional live-migration agents (LMAs) work with traditional load balancing systems which may read network locations of receiver servers from a configuration file that is only occasionally updated (i.e., static). However, updating the configuration file in the cloud native service scenario has proven more difficult.

BRIEF SUMMARY OF DISCLOSURE

According to an implementation, a computer-implemented method may include identifying, via a computing device, a first software agent communicatively coupled to a host device and at least one server. A configuration file associated with the first software agent may be transformed for operation with a second software agent. The first software agent may be switched to the second software agent in response to transforming the configuration file associated with the first software agent.

One or more of the following features may be included. A service registration agent may be deployed to the at least one server. The at least one server may be registered, via the service registration agent, to a service registry for dynamic routing between the second software agent and the at least one server. The first software agent may be configured for static routing of data between the host device and the at least one server. The second software agent may be configured for dynamic routing of data between the host device and the at least one server. A service registry associated with the at least one server may be identified. The second software agent may be communicatively coupled to the host device and the at least one server prior to switching from the first software agent.

According to another implementation, a computer program product may include a non-transitory computer readable storage medium having a plurality of instructions stored on it. When executed by a processor, the instructions may cause the processor to perform operations including, but not limited to, identifying a first software agent communicatively coupled to a host device and at least one server. A configuration file associated with the first software agent may be transformed for operation with a second software agent. The first software agent may be switched to the second software agent in response to transforming the configuration file associated with the first software agent.

One or more of the following features may be included. A service registration agent may be deployed to the at least one server. The at least one server may be registered, via the service registration agent, to a service registry for dynamic routing between the second software agent and the at least one server. The first software agent may be configured for static routing of data between the host device and the at least one server. The second software agent may be configured for dynamic routing of data between the host device and the at least one server. A service registry associated with the at least one server may be identified. The second software agent may be communicatively coupled to the host device and the at least one server prior to switching from the first software agent.

According to another implementation, a computing system may include a processor and a memory module coupled with the processor. The processor may be configured for identifying a first software agent communicatively coupled to a host device and at least one server. A configuration file associated with the first software agent may be transformed for operation with a second software agent. The first software agent may be switched to the second software agent in response to transforming the configuration file associated with the first software agent.

One or more of the following features may be included. A service registration agent may be deployed to the at least one server. The at least one server may be registered, via the service registration agent, to a service registry for dynamic routing between the second software agent and the at least one server. The first software agent may be configured for static routing of data between the host device and the at least one server. The second software agent may be configured for dynamic routing of data between the host device and the at least one server. A service registry associated with the at least one server may be identified. The second software agent may be communicatively coupled to the host device and the at least one server prior to switching from the first software agent.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION

Figure 1:
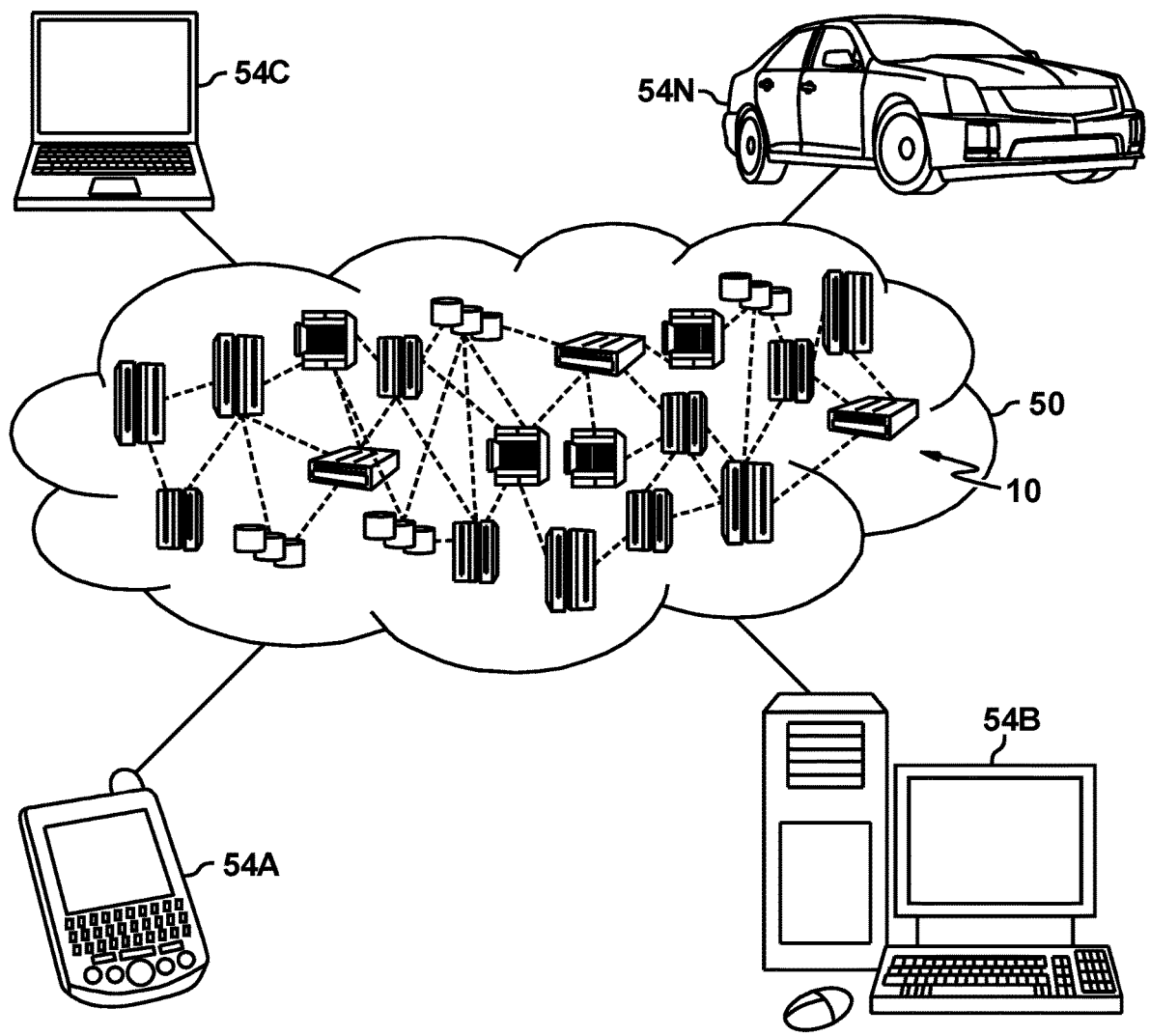
FIG. 1 is a diagrammatic view of a cloud computing environment including a computing device that executes an agent switching process according to an implementation of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. An example of such a cloud model may include at least five characteristics, at least three service models, and at least four deployment models.

Characteristics may be as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may be as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative example cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
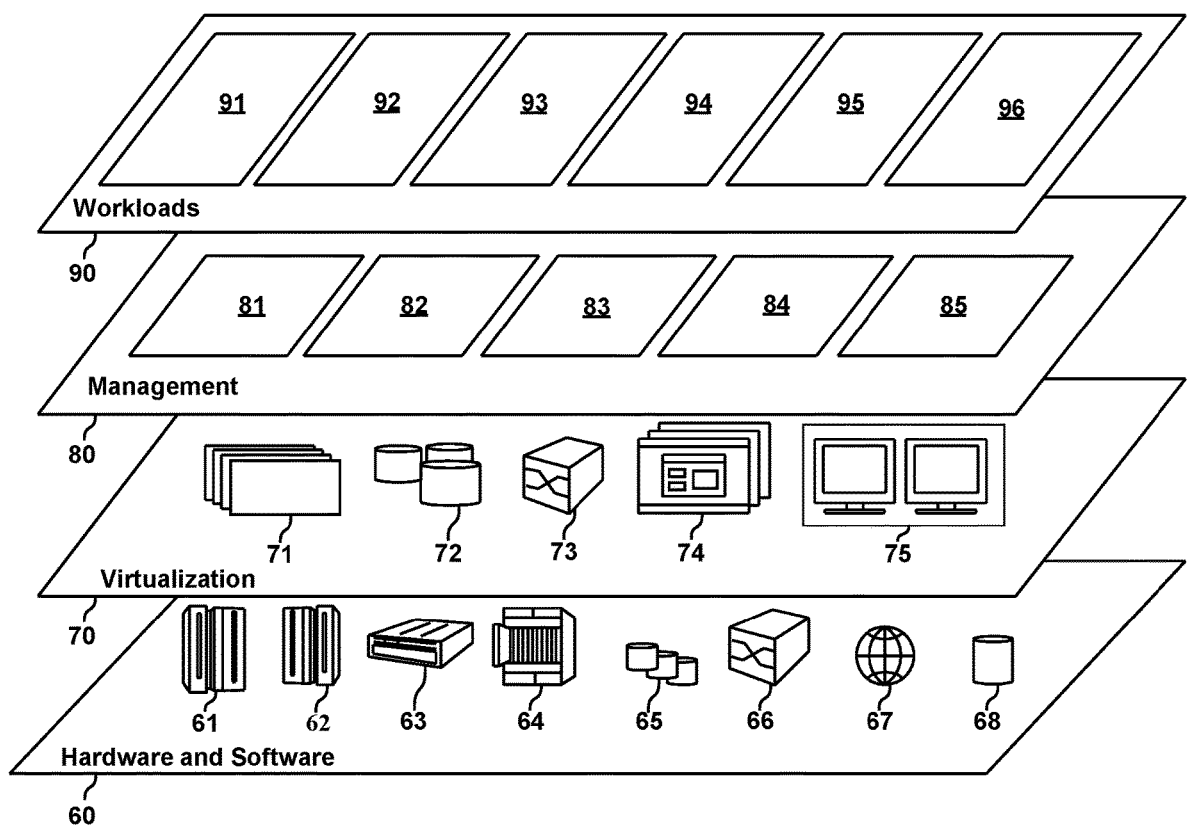
FIG. 2 is a diagrammatic view of functional abstraction layers provided by cloud computing environment for executing an agent switching process according to an implementation of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and agent switching process 96.

Figure 3:
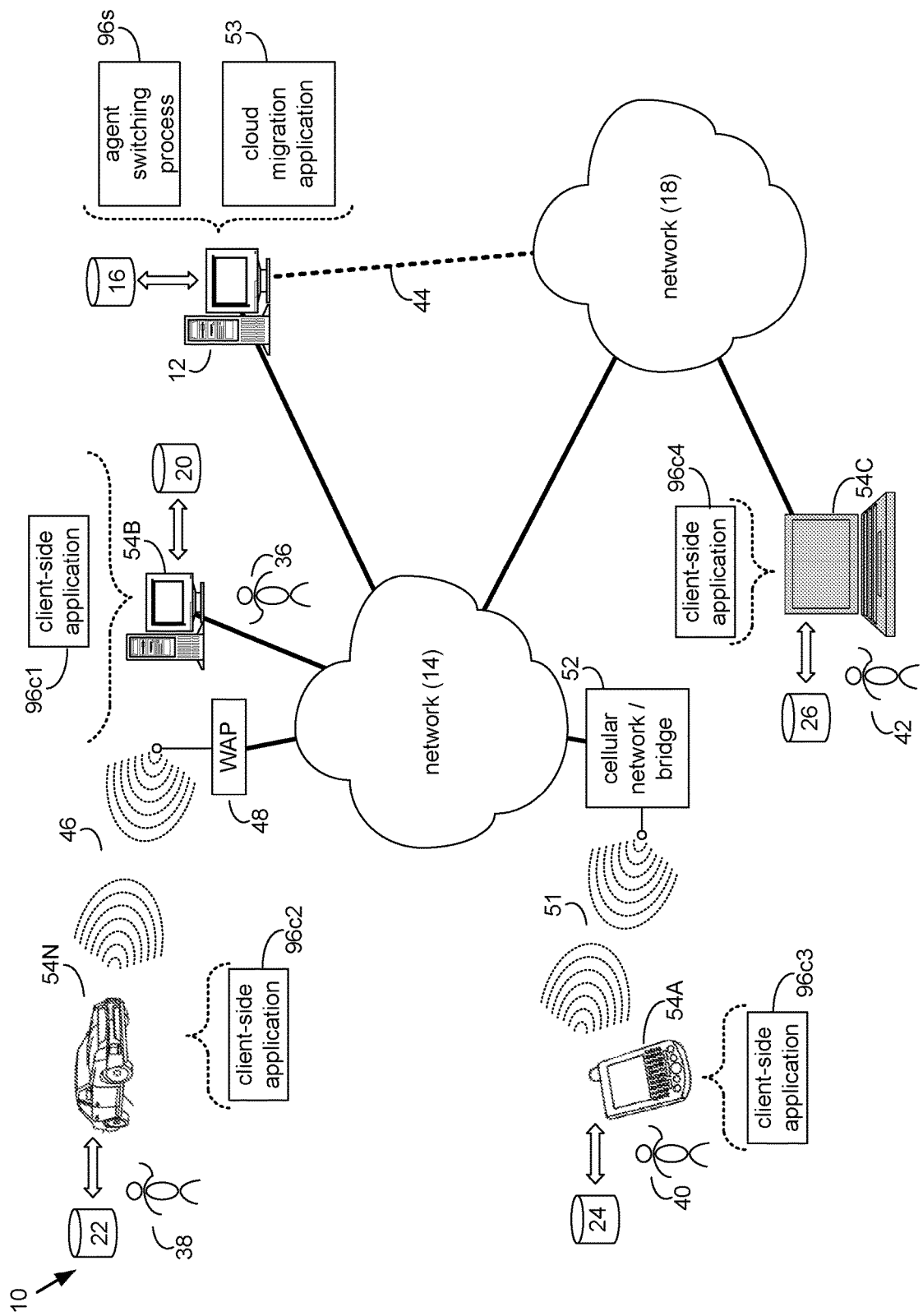
FIG. 3 is a diagrammatic view of a distributed computing network including a computing device that executes an agent switching process according to an implementation of the present disclosure.

Referring also to FIG. 3, there is shown agent switching 96 in one illustrative example environment. For the following discussion, it is intended to be understood that agent switching process 96 may be implemented in a variety of ways. For example, agent switching process 96 may be implemented as a workload as described above, and additionally and/or alternatively as a server-side process, a client-side process, or a server-side/client-side process.

For example, agent switching process 96 may be implemented as a purely server-side process via agent switching process 96s. Alternatively, agent switching process 96 may be implemented as a purely client-side process via one or more of client-side application 96c1, client-side application 96c2, client-side application 96c3, and client-side application 96c4. Alternatively still, agent switching process 96 may be implemented as a server-side/client-side process via server-side agent switching process 96s in combination with one or more of client-side application 96c1, client-side application 96c2, client-side application 96c3, and client-side application 96c4. In such an example, at least a portion of the functionality of agent switching process 96 may be performed by agent switching process 96s and at least a portion of the functionality of agent switching process 96 may be performed by one or more of client-side application 96c1, 96c2, 96c3, and 96c3.

Accordingly, agent switching process 96 as used in this disclosure may include any combination of agent switching process 96s, client-side application 96c1, client-side application 96c2, client-side application 96c3, and client-side application 96c4.

Figure 4:
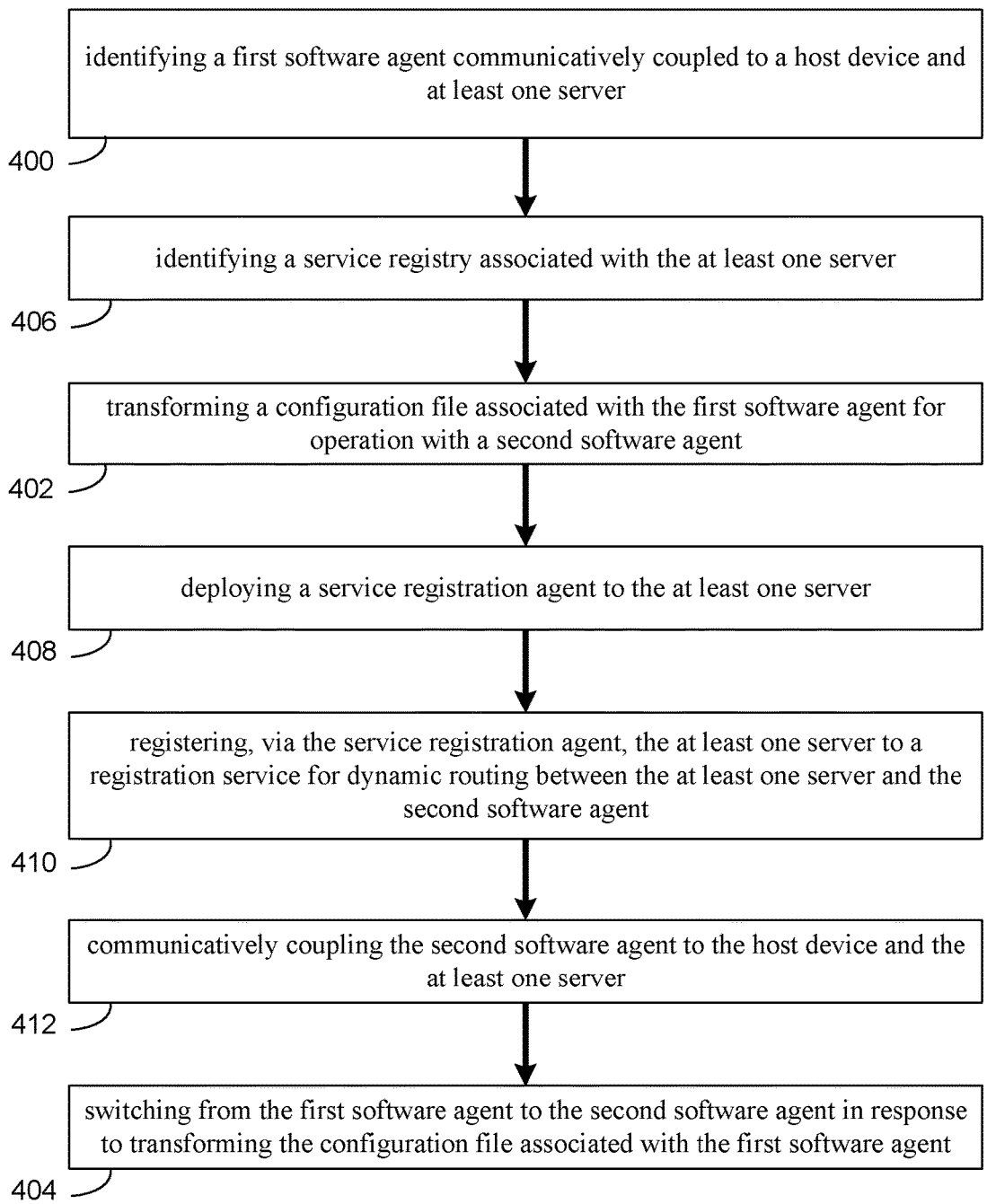
FIG. 4 is a flowchart of the agent switching process of FIG. 1, according to an implementation of the present disclosure.

Referring also to FIG. 4, and as will be discussed in greater detail below, agent switching process 96 may identify 400, via the computing device, a first software agent communicatively coupled to a host device and at least one receiver server. A configuration file associated with the first software agent may be transformed 402 for operation with a second software agent. The first software agent may be switched 404 to the second software agent in response to transforming the configuration file associated with the first software agent.

Agent switching process 96s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of agent switching process 96s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 96c1, 96c2, 96c3, 96c4 may include but are not limited to, one or more of a data object collaboration application, a web browser (e.g., which may execute a thin client, applet, or the like), or a specialized application (e.g., an application running on a mobile platform). The instruction sets and subroutines of client-side application 96c1, 96c2, 96c3, 96c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access agent switching process 96 directly through network 14 or through secondary network 18. Further, agent switching process 96 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 51 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, agent switching process 96 may communicate with, interact with, and/or include a component or module of a cloud migration application (e.g., cloud migration application 53). As is generally known, a cloud migration application (e.g., cloud migration application 53) may generally facilitate migration and inspection of data to and from a cloud computing environment.

In an embodiment, the instruction sets and subroutines of cloud migration application 53 may be stored, e.g., on storage device 16 associated with server computer 12, which executes cloud migration application 53, and/or another suitable storage device. Further, users (e.g., one or more of users 36, 38, 40, 42) may access cloud migration application 53 in order to migrate data to and/or inspect data within a cloud computing environment. The users may access cloud migration application 53 via one or more suitable applications, such as client side applications 96c1-96c4 (e.g., which may include a web browser, a client electronic meeting application, or another application) and/or via a different application (not shown). Additionally, while some users are depicted as being connected with server computer 12 (and therefore with cloud migration application 53) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of agent switching process 96 may be provided by one or more of client side applications 96c1-96c4. For example, in some embodiments agent switching process 96 (and/or client-side functionality of agent switching process 96) may be included within and/or interactive with client-side applications 96c1-96c4, which may include client side electronic communication applications, web browsers, or another application. Various additional/alternative configurations may be equally utilized.

As will be described in greater detail below, in some embodiments, the present disclosure may allow switching between a plurality of software agents. For example, in modern cloud-based microservices/applications, service instances may have dynamically-assigned network locations. Moreover, the set of service instances may change dynamically because of auto-scaling, failures, upgrades, etc. As such, client code may need to use a more elaborate service discovery mechanism.

Additionally, conventional live-migration agents (LMAs) work with traditional load balancing systems which may read network locations of receiver servers from a configuration file that is only occasionally updated (i.e., static). However, updating the configuration file in the cloud native service scenario has proven more difficult. Embodiments of the present disclosure may allow a configuration file with static network locations to be dynamically updated by transforming the configuration file and switching a legacy or static software agent with a dynamic software agent. Additionally embodiments of the present disclosure may allow live transition from existing legacy cloud modality to cloud native modality for software agents with zero downtime.

As generally discussed above with reference to FIG. 4, agent switching process 96 may identify 400, via the computing device, a first software agent communicatively coupled to a host device and at least one server. A computing device, as used herein may include, but is not limited to, a personal computer, a server computer, a series of server computers, a mini computer, a mainframe computer, or a dedicated network device. Examples of computing device may include computing device 12 as shown in FIG. 1 and/or server 63 as shown in FIG. 3. However, other computing devices are within the scope of the present disclosure. A software agent may generally include a software module configured for providing data from a host device to at least one server. Examples of software agent may include live migration agents (LMAs), security software agents, encryption software agents, audit software agents, etc. While examples of specific software agents will be discussed below, it will be appreciated that any software agent may be used within the scope of the present disclosure. In some embodiments, at least one server or receiver server may store data from a plurality of host devices to form a network of storage devices. As discussed above and in some embodiments, the server or receiver server may form at least a portion of a cloud computing environment.

Figure 5:
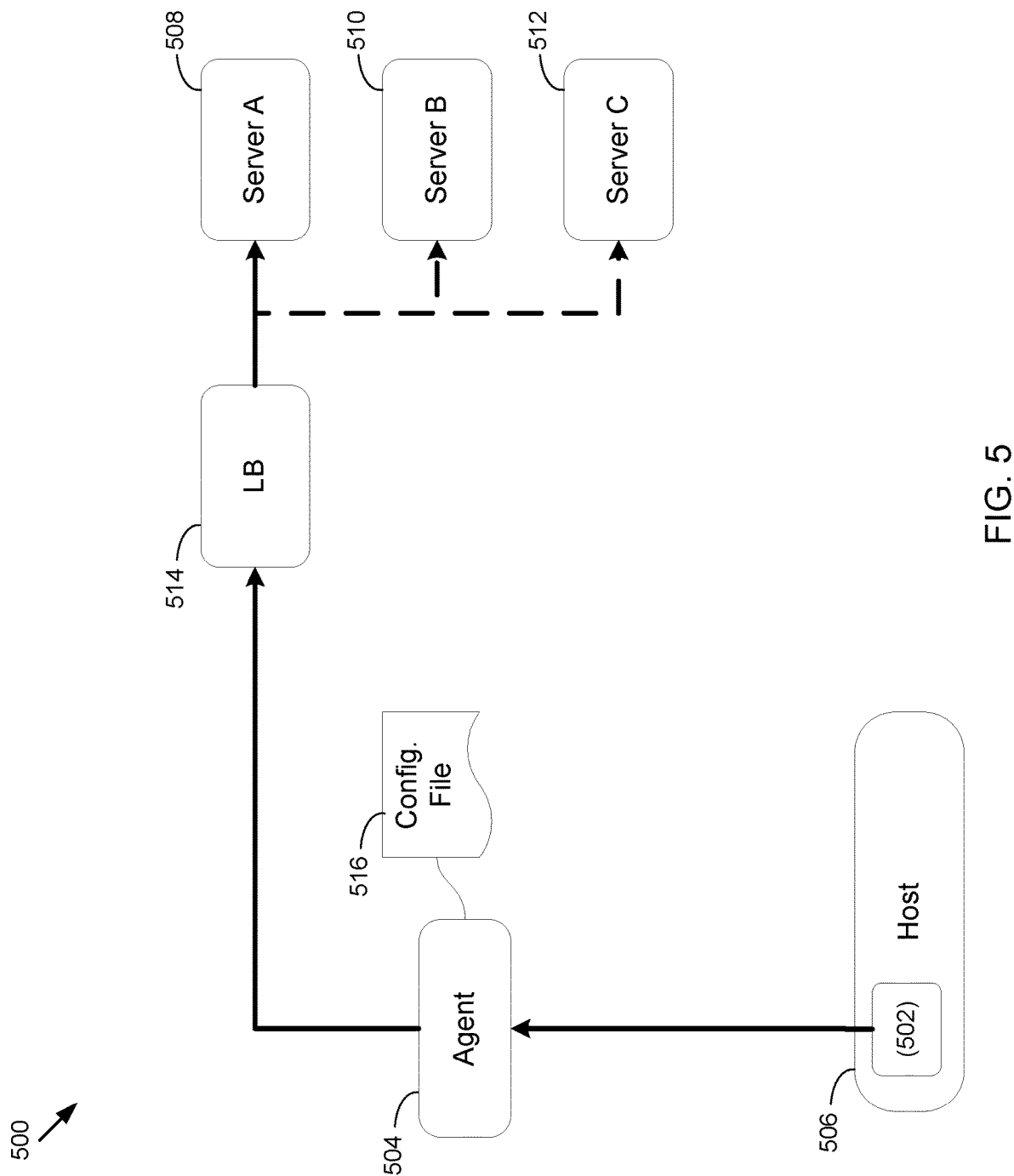
FIG. 5 diagrammatically depicts an implementation of the agent switching process of FIG. 1, according to an example embodiment.

In some embodiments and referring also to FIG. 5, the software agent may have limited or defined access to certain portions of the host device to limit security vulnerabilities, protect private data, etc. One example of a software agent may include a software module configured to provide monitoring or logging data (e.g., data 502) associated with the host device to at least one server (e.g., a cloud computing environment). It will be appreciated that many types of data (e.g., other than the exemplary monitoring or logging data) may be transmitted to and/or from a host device via a software agent. In some implementations, the software agent may provide a host device with access (e.g., via a "dashboard" application) to data stored on the at least one server. In this manner, a software agent may generate a request to the at least one server when a host device requests certain data.

As will be discussed in greater detail below, conventional software agents may include legacy software agents that may include static lists or configuration lists of IP addresses of receiver servers. When these receiver servers become unavailable, the data requested from or transmitted to that receiver server may be lost.

In some embodiments, the first software agent may be configured for static routing of data between the at least one receiver server and the host device. Referring also to FIG. 5, a first software agent (first software agent 504) may be communicatively coupled to a host device (e.g., host device 506) and a least one server or receiver server (e.g., servers 508, 510, 512). In some implementations, the first software agent may be communicatively coupled with a load balancer (e.g., load balancer 514) for load balancing between the at least one server (e.g., servers 508, 510, 512). As will be discussed in greater detail below, the configuration file (e.g., configuration file 516) associated with the first software agent (e.g., first software agent 504) may be "static" with static IP addresses. In this manner, the configuration file may require updating when dynamically-assigned microservice instances change.

Figure 6:
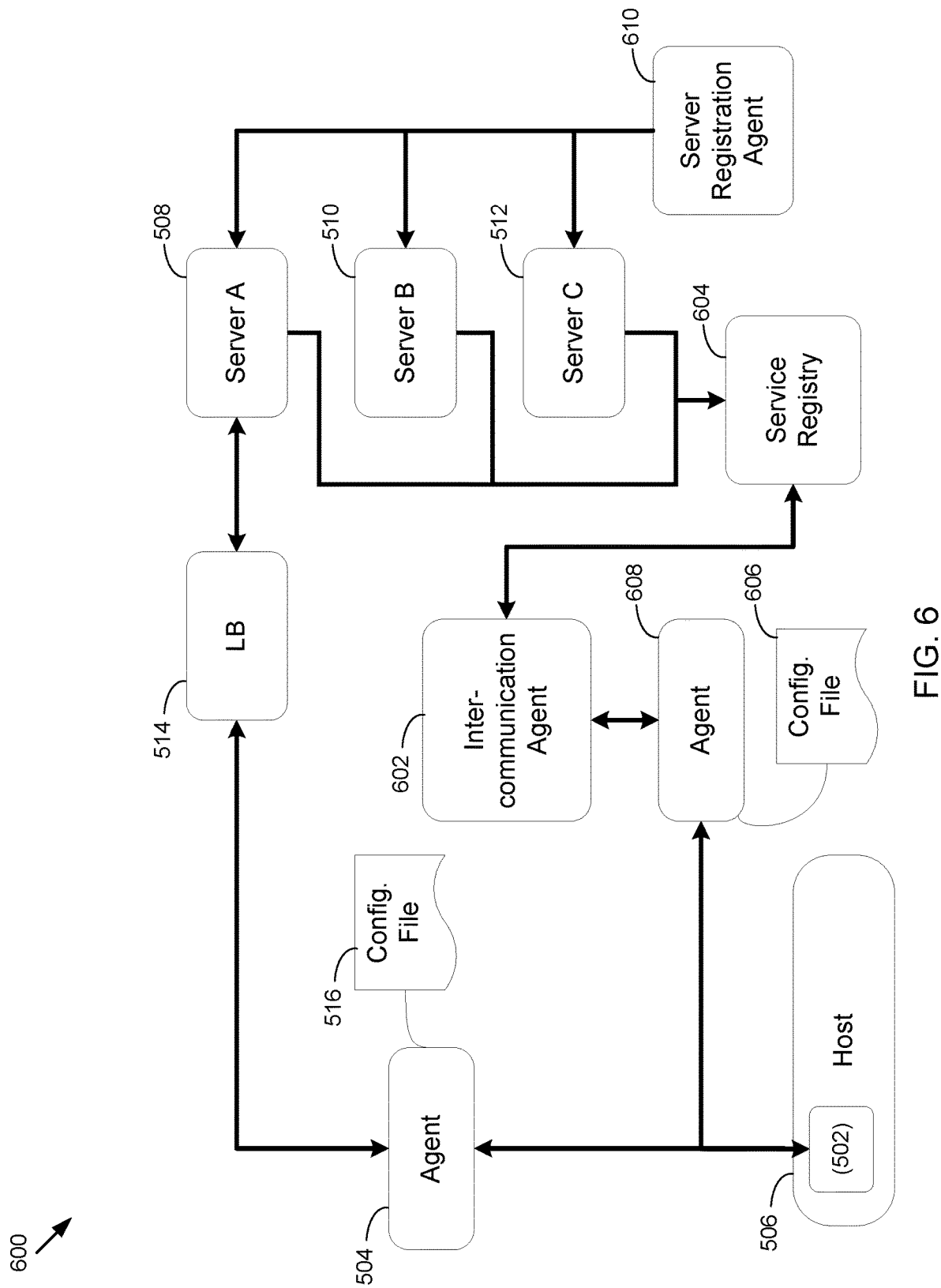
FIG. 6 diagrammatically depicts an implementation of the agent switching process of FIG. 1, according to an example embodiment.

In some embodiments, agent switching process 96 may deploy an inter-communication agent on the host device. Referring also to FIG. 6, the inter-communication agent (e.g., inter-communication agent 602) may be deployed on the host device. For example, agent switching process 96 may install or communicatively couple the inter-communication agent to the host device (e.g., host device 506). In some embodiments, the inter-communication agent (e.g., inter-communication agent 602) may generally include a software agent configured to interface with the first software agent (e.g., first software agent 504), a second software agent, a host device, a service registry, and other components of the cloud computing environment. Agent switching process 96 may identify 400 the first communication agent (e.g., first communication agent 504) communicatively coupled to the host device (e.g., host device 506) and the at least one receiver server (e.g., servers 508, 510, 512). In some embodiments, identifying 400 the first communication agent may include retrieving a configuration file (e.g., configuration file 516) associated with the first software agent (e.g., first software agent 504). For example, agent switching process 96 may identify 400 first communication agent 504 and retrieve configuration file 516 associated with first communication agent 504. In some embodiments, agent switching process 96 may detect or discover the static configuration of configuration file 516.

In some embodiments, agent switching process 96 may identify 406 a service registry (e.g., service registry 604). A service registry may generally include a registry capable of registering servers for receiving and/or transmitting data between a host device and at least one server dynamically. In this manner, the service registry may permit dynamic addressing as opposed to static IP addresses associated with specific servers. For example and in response to identifying 406 a service registry, agent switching process 96 may transform 402 a configuration file associated with the first software agent for operation with a second software agent and a service registry and switch 404 from the first software agent to the second software agent. As will be discussed in greater detail below, such a switch between software agents may be beneficial to cloud computing environments as legacy software agents may be unable to interact with or communicate with dynamic addresses of a service registry.

In some embodiments, agent switching process 96 may transform 402 a configuration file associated with the first software agent for operation with a second software agent. For example and referring also to FIG. 7 and in some embodiments, agent switching process 96 may transform 402 the configuration file (e.g., configuration file 516) associated with the first software agent (e.g., first software agent 504) by modifying the code of the configuration file (e.g., configuration file 516) to generate a configuration file (e.g., configuration file 606) configured for operation with a second software agent (e.g., second software agent 608).

Figure 7:
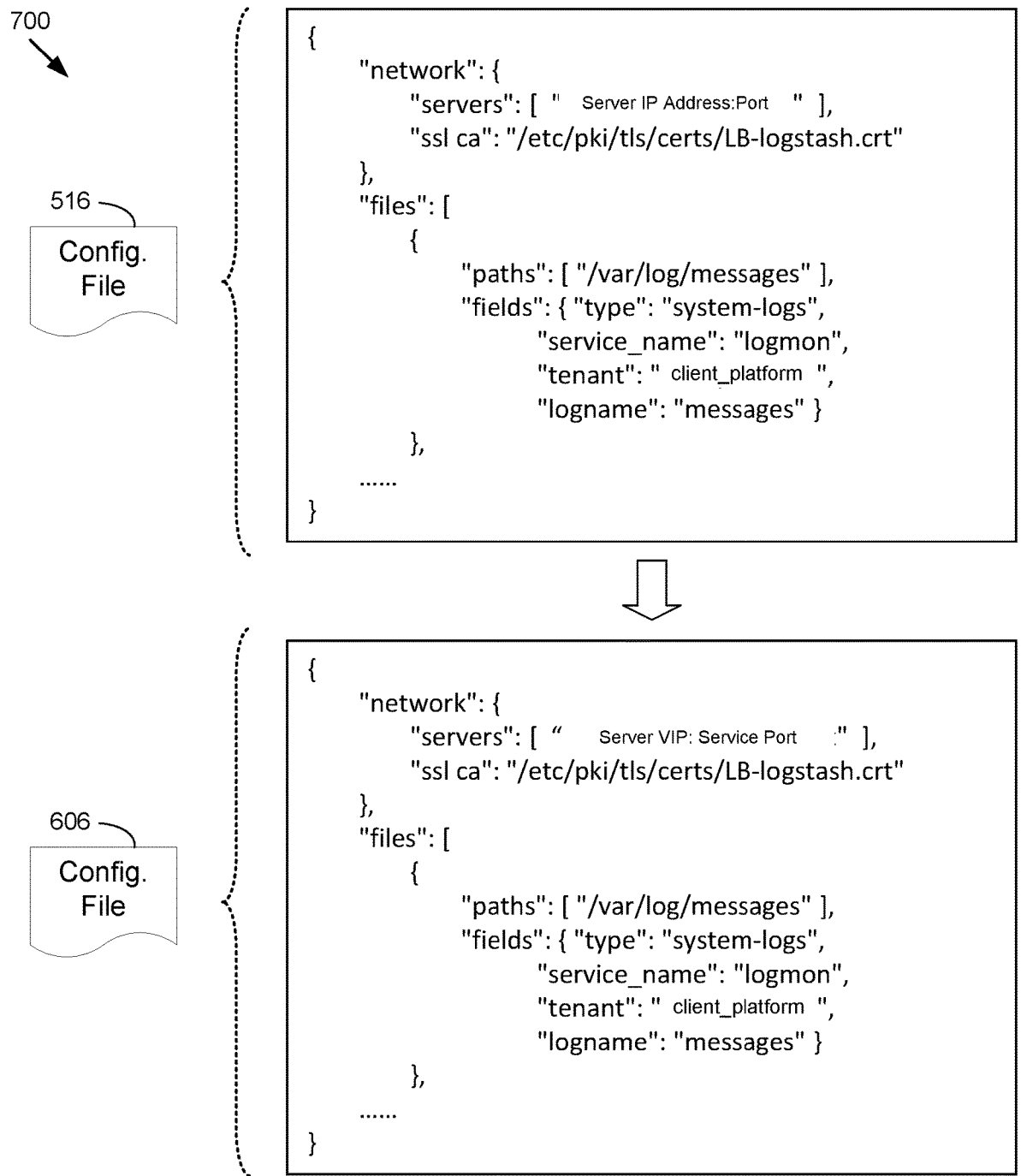
FIG. 7 diagrammatically depicts an implementation of the agent switching process of FIG. 1, according to an example embodiment.

In the example of FIG. 7, the inter-communication agent (e.g., inter-communication agent 602) may include information for modifying at least a portion of the second software agent (e.g., second software agent 608). In this manner, the configuration file may be transformed 402 by modifying the static address(es) of the configuration file with a dynamic address. For example, the "servers" reference of configuration file 516 may be transformed to the "servers" reference as shown in configuration file 606. In this example, the dynamic address may be a virtual IP address with a dynamic port (e.g., "ServicePort"). As inter-communication agent 602 is able to modify second software agent 608, the port reference may be a dynamic port reference.

Figure 8:
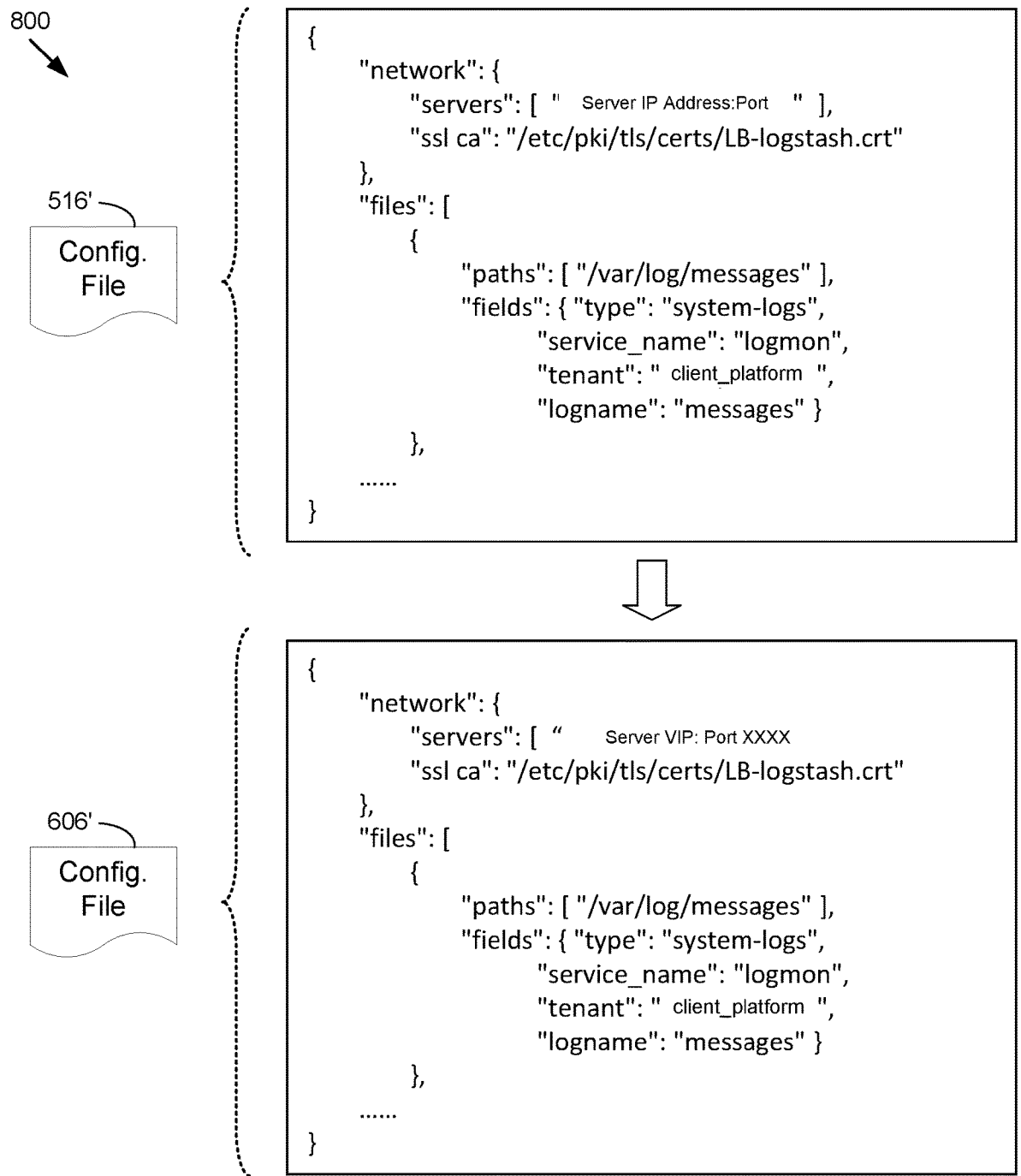
FIG. 8 diagrammatically depicts an implementation of the agent switching process of FIG. 1, according to an example embodiment.

In the example of FIG. 8, the inter-communication agent (e.g., inter-communication agent 602) may not include information or code for modifying at least a portion of the second software agent. In contrast to the example of FIG. 7, the second software agent may be secured from modifications by the inter-communication agent. In this manner, inter-communication agent 602 may include local routing rules for transforming the configuration file for operation with the second software agent (e.g., second software agent 608). In this manner, the configuration file may be transformed 402 by modifying the static address(es) of the configuration file with a dynamic address. For example, the "servers" reference of configuration file 516' may be transformed to the "servers" reference as shown in configuration file 606'. In this example, the dynamic address may be a virtual IP address with a port defined by the local routing rules (e.g., port "XXXX", where port "XXXX" is the designation for a particular port).

In some embodiments, the second software agent may be configured for dynamic routing of data between the the host device and the at least one receiver server. As discussed above, the second software agent (e.g., second software agent 608) may be configured for cloud native modality and dynamically interfacing with a plurality of servers. Returning to the example of FIG. 6 and in some embodiments, agent switching process 96 may deploy (e.g., via inter-communication agent 602) the second software agent (e.g., second software agent 608) on the host device (e.g., host device 506) as a microservice.

In some embodiments, agent switching process 96 may deploy 408 a service registration agent to the at least one receiver server. For example and referring again to FIG. 6, agent switching process 96 may deploy a service registration agent (e.g., service registration agent 610) on the at least one server. In some embodiments, agent switching process 96 may register 410, via the service registration agent (e.g., service registration agent 610), the at least one server to a service registry for dynamic routing between the second software agent and the at least one receiver server. A service registry may generally include a service configured to register services. In some embodiments, the at least one server may be registered 410 on the service registry (e.g., service registry 604). In this manner, the at least one server may be enabled for dynamic routing between the host device via the second software agent. Registering 410 the at least one server may include transforming code associated with the server, via the service registration agent. The transformed code may enable the at least one server to communicate with the service registry and provide availability for dynamic connections with the second software agent. As will be discussed in greater detail below, the at least one server may provide its availability for communicating with the second software agent and the service registry may define a plurality of possible connections between the at least one server and the second software agent.

In some embodiments and in response to the server registration agent registering 410 the at least one server for dynamic routing between the second software agent and the at least one server, agent switching process 96 may register the second software agent on the service registry. In this manner, the second software agent may be enabled for dynamic routing between the host device via the second software agent.

Figure 9:
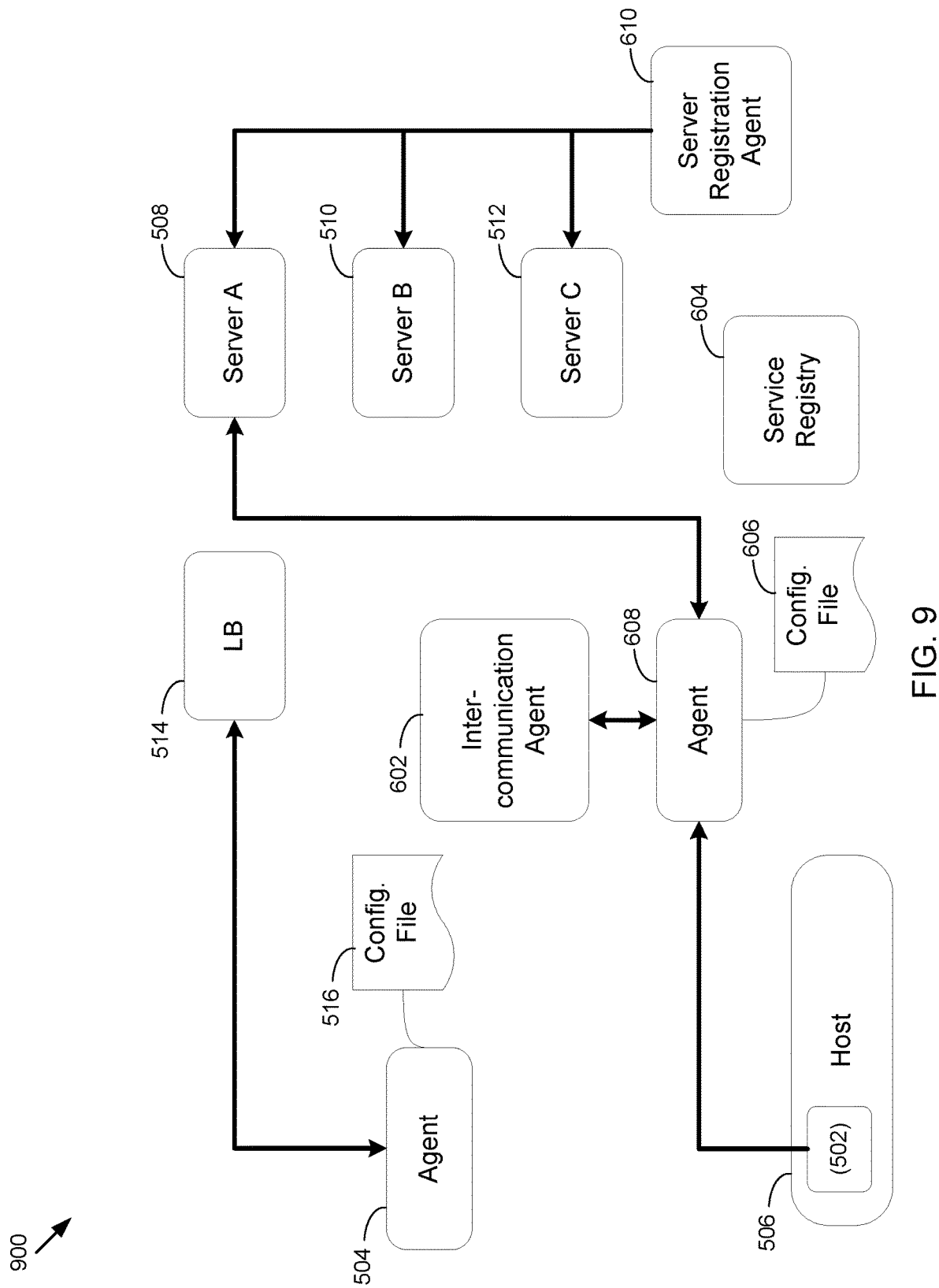
FIG. 9 diagrammatically depicts an implementation of the agent switching process of FIG. 1, according to an example embodiment.

In some embodiments, agent switching process 96 may switch 404 from the first software agent to the second software agent in response to transforming the configuration file associated with the first software agent. Referring also to FIG. 9 and in response to transforming the configuration file for operation with the second software agent, agent switching process 96 may switch the communication between the host device (e.g., host device 506) and the at least one server (e.g., servers 508, 510, 512) from the first software agent (e.g., first software agent 504) to the second software agent (e.g., second software agent 608). In some embodiments, agent switching process 96 may sunset or otherwise deactivate the first software agent (e.g., first software agent 504) in response to switching 404 from the first software agent to the second software agent (e.g., second software agent 608).

In some embodiments, agent switching process 96 may communicatively couple 412 the second software agent to the host device and the at least one server prior to switching 404 from the first software agent. For example and in response to registering the at least one server and the second software agent, agent switching process may communicatively couple 412 the second software agent (e.g., second software agent 608) and the at least one server (e.g., servers 508, 510, 512) based upon, at least in part, a plurality of possible connections defined by the service registry (e.g., service registry 604). In some embodiments, agent switching process 96 may verify communicative coupling between the second software agent and the at least one server prior to switching from the first software agent. In response to verifying communicative coupling 412 between the second software agent and the at least one server via the transformed configuration file, agent switching process 96 may switch 404 from the first software agent to the second software agent. As shown in FIG. 9, agent switching process 96 may disconnect the first communication agent from the host device. If agent switching process 96 is unable to verify communicative coupling between the second software agent and the at least one server, agent switching process 96 may unregister the second software agent from the service registry and maintain the communicative coupling between the host device and the at least one server via the first software agent.

In an example embodiment, the first software agent may include a "green" legacy LMA configured for a load balancing methodology and the second software agent may include a "blue" LMA configured for dynamic routing between the host device and the at least one server. In this manner and as described above, agent switching process 96 may switch LMA agents in run-time to switch from legacy cloud modality to support cloud native modality.

Figure 10:
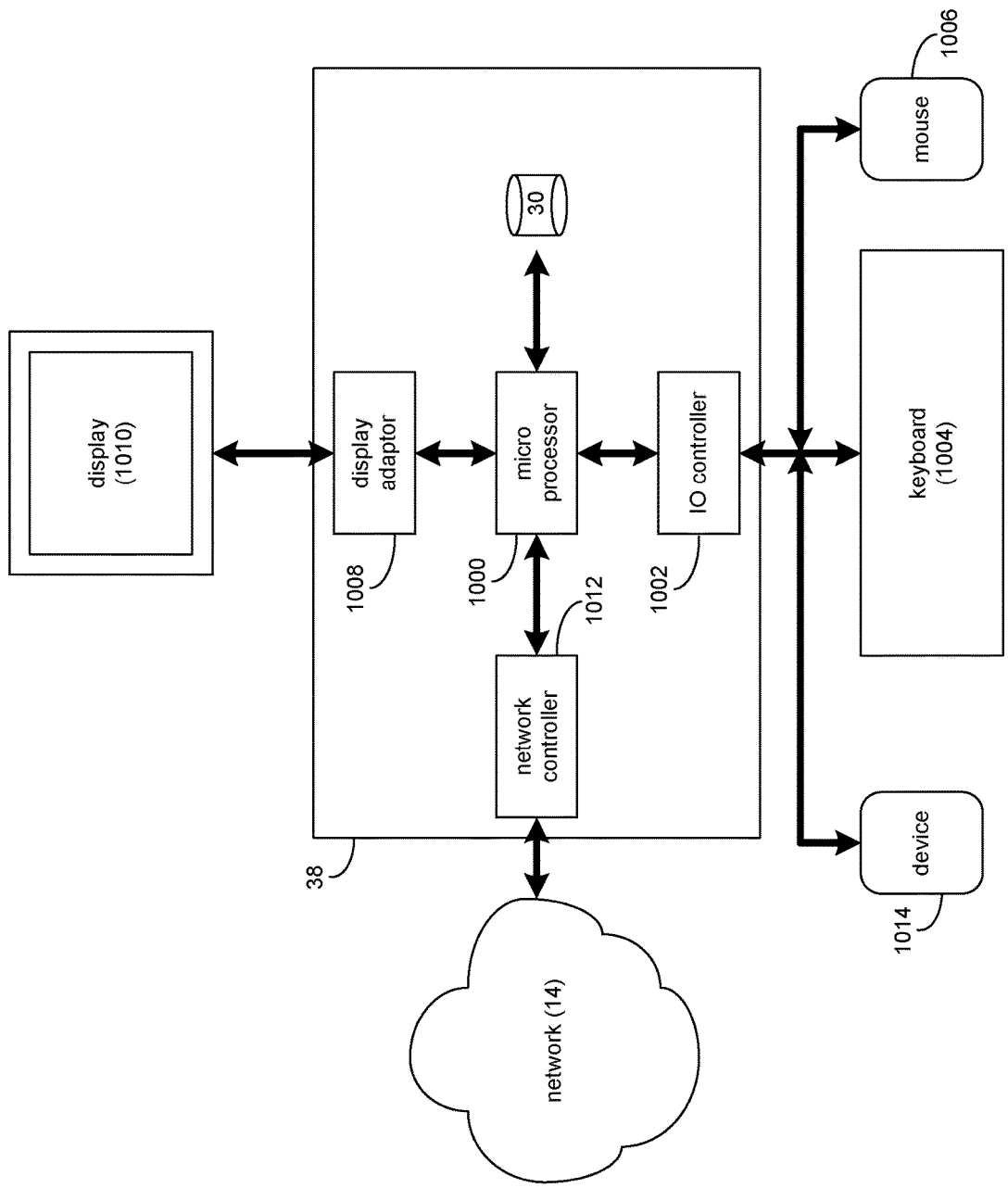
FIG. 10 is a diagrammatic view of the computing device of FIG. 1, according to an implementation of the present disclosure.

Referring also to FIG. 10, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, agent switching process 96 may be substituted for computing device 12 within FIG. 10, examples of which may include but are not limited to client electronic devices 54A-54N.

Computing system 12 may include microprocessor 1000 configured to e.g., process data and execute instructions/ code for screen capture process 10. Microprocessor 1000 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. 10 controller 1002 may be configured to couple microprocessor 1000 with various devices, such as keyboard 1004, mouse 1006, USB ports (not shown), and printer ports (not shown). Display adaptor 1008 may be configured to couple display 1010 (e.g., a CRT or LCD monitor) with microprocessor 1000, while network adapter 1012 (e.g., an Ethernet adapter) may be configured to couple microprocessor 1000 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for switching between software agents comprising:
    identifying, via a computing device, a first software agent communicatively coupled to a host device and at least one server;
    transforming a configuration file associated with the first software agent for operation with a second software agent; and
    switching from the first software agent to the second software agent in response to transforming the configuration file associated with the first software agent.

2. The computer-implemented method of claim 1, further comprising:
    deploying a service registration agent to the at least one server.

3. The computer-implemented method of claim 2, further comprising:
    registering, via the service registration agent, the at least one server to a service registry for dynamic routing between the second software agent and the at least one server.

4. The computer-implemented method of claim 1, wherein the first software agent is configured for static routing of data between the host device and the at least one server.

5. The computer-implemented method of claim 1, wherein the second software agent is configured for dynamic routing of data between the host device and the at least one server.

6. The computer-implemented method of claim 1, further comprising:
   identifying a service registry associated with the at least one server.

7. The computer-implemented method of claim 1, further comprising:
   communicatively coupling the second software agent to the host device and the at least one server prior to switching from the first software agent.

8. A computer program product comprising a non-transitory computer readable storage medium having a plurality of instructions stored thereon, which, when executed by a processor, cause the processor to perform operations comprising:
   identifying a first software agent communicatively coupled to a host device and at least one server;
   transforming a configuration file associated with the first software agent for operation with a second software agent; and
   switching from the first software agent to the second software agent in response to transforming the configuration file associated with the first software agent.

9. The computer program product of claim 8, wherein the operations further comprise:
   deploying a service registration agent to the at least one server.

10. The computer program product of claim 9, wherein the operations further comprise:
    registering, via the service registration agent, the at least one server to a service registry for dynamic routing between the second software agent and the at least one server.

11. The computer program product of claim 8, wherein the first software agent is configured for static routing of data between the host device and the at least one server.

12. The computer program product of claim 8, wherein the second software agent is configured for dynamic routing of data between the host device and the at least one server.

13. The computer program product of claim 8, wherein the operations further comprise:
    identifying a service registry associated with the at least one server.

14. The computer program product of claim 8, wherein the operations further comprise:
    communicatively coupling the second software agent to the host device and the at least one server prior to switching from the first software agent.

15. A computing system including one or more processors and one or more memories configured to perform operations comprising:
    identifying a first software agent communicatively coupled to a host device and at least one server;
    transforming a configuration file associated with the first software agent for operation with a second software agent; and
    switching from the first software agent to the second software agent in response to transforming the configuration file associated with the first software agent.

16. The computing system of claim 15, wherein the operations further comprise:
    deploying a service registration agent to the at least one server.

17. The computing system of claim 16, wherein the operations further comprise:
    registering, via the service registration agent, the at least one server to a service registry for dynamic routing between the second software agent and the at least one server.

18. The computing system of claim 15, wherein the first software agent is configured for static routing of data between the host device and the at least one server.

19. The computing system of claim 15, wherein the second software agent is configured for dynamic routing of data between the host device and the at least one server.

20. The computing system of claim 15, wherein the operations further comprise: identifying a service registry associated with the at least one server.

* * * * *